(12) United States Patent
Dubois et al.

(10) Patent No.: US 10,543,566 B2
(45) Date of Patent: Jan. 28, 2020

(54) METHOD FOR PRODUCING AN OPHTHALMIC LENS COMPRISING A STEP OF LASER MARKING IN ORDER TO PRODUCE PERMANENT ETCHINGS ON ONE SURFACE OF SAID OPHTHALMIC LENS

(71) Applicant: ESSILOR INTERNATIONAL (Compagnie Generale d'Optique), Charenton-le-Pont (FR)

(72) Inventors: Frederic Dubois, Charenton-le-Pont (FR); Sebastien Maurice, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 695 days.

(21) Appl. No.: 14/898,711

(22) PCT Filed: Jun. 25, 2014

(86) PCT No.: PCT/FR2014/051600
§ 371 (c)(1),
(2) Date: Dec. 15, 2015

(87) PCT Pub. No.: WO2014/207381
PCT Pub. Date: Dec. 31, 2014

(65) Prior Publication Data
US 2016/0167173 A1    Jun. 16, 2016

(30) Foreign Application Priority Data

Jun. 28, 2013  (FR) .................................... 13 56325

(51) Int. Cl.
*B23K 26/362* (2014.01)
*B23K 26/402* (2014.01)
*G02C 7/02* (2006.01)

(52) U.S. Cl.
CPC .......... *B23K 26/362* (2013.01); *B23K 26/402* (2013.01); *G02C 7/021* (2013.01)

(58) Field of Classification Search
None
See application file for complete search history.

(56) References Cited

U.S. PATENT DOCUMENTS

| | | | |
|---|---|---|---|
| 3,657,085 A | 4/1972 | Hoffmeister et al. | |
| 4,194,814 A * | 3/1980 | Fischer | B29C 59/16 351/159.02 |

(Continued)

FOREIGN PATENT DOCUMENTS

| | | |
|---|---|---|
| DE | 102010010337 | 9/2011 |
| WO | 2012084798 | 6/2012 |

OTHER PUBLICATIONS

International Search Report PCT/FR2014/051600 dated Sep. 3, 2014.

*Primary Examiner* — Ibrahime A Abraham
*Assistant Examiner* — Gyounghyun Bae
(74) *Attorney, Agent, or Firm* — Young & Thompson

(57) ABSTRACT

A method for producing an ophthalmic lens includes a step of laser marking in order to produce permanent etchings on one surface of the lens, at least one predefined step subsequent to the marking step and implementing extreme thermal stress that is applied to the surface, and a step of determining an operating point (PF) of a laser marking machine (1) configured to implement the marking step from geometric characteristics (Di) of the etchings to be made, the determining step including the steps of determining (304) a value (CPM) representative of the deformation of the lens on at least one treatment area of the surface, from the stress and data relative to a predetermined material from which the lens is formed, and of deducing (308) the operating point from (Continued)

the value representative of deformation and from the geometric characteristics.

17 Claims, 5 Drawing Sheets

(56) References Cited

U.S. PATENT DOCUMENTS

| | | | | |
|---|---|---|---|---|
| 4,679,918 A * | 7/1987 | Ace | ............ | G02C 7/02 351/159.62 |
| 4,750,829 A * | 6/1988 | Wise | ............ | A61F 9/009 351/159.03 |
| 4,783,374 A * | 11/1988 | Custer | ............ | B05D 1/62 428/447 |
| 5,053,171 A * | 10/1991 | Portney | ............ | A61F 2/16 264/1.37 |
| 5,274,502 A * | 12/1993 | Demerritt | ............ | C03B 11/08 359/642 |
| 5,323,191 A * | 6/1994 | Firtion | ............ | B32B 17/10018 351/159.01 |
| 5,851,328 A * | 12/1998 | Kohan | ............ | B29D 11/0073 156/102 |
| 6,264,692 B1 * | 7/2001 | Woffinden | ............ | A61F 2/16 623/6.17 |
| 2003/0224587 A1 * | 12/2003 | Yamazaki | ............ | G02B 27/0961 438/487 |
| 2005/0200961 A1 * | 9/2005 | Rosenbluh | ............ | C03B 23/02 359/626 |
| 2006/0073771 A1 * | 4/2006 | mandler | ............ | B24B 13/0057 451/42 |
| 2007/0076301 A1 * | 4/2007 | Couto | ............ | B29D 11/00317 359/642 |
| 2009/0303442 A1 * | 12/2009 | Choo | ............ | G02C 7/047 351/246 |
| 2010/0141729 A1 * | 6/2010 | Petsch | ............ | B41M 5/267 347/225 |
| 2012/0223061 A1 * | 9/2012 | Atsumi | ............ | B23K 26/0608 219/121.72 |
| 2012/0229754 A1 * | 9/2012 | Iyer | ............ | G02C 7/083 351/159.4 |
| 2013/0120707 A1 * | 5/2013 | Shan | ............ | B29D 11/00269 351/159.01 |
| 2013/0162943 A1 * | 6/2013 | Goodenough | ............ | G02C 7/04 351/159.33 |
| 2013/0204363 A1 * | 8/2013 | Aksan | ............ | A61L 27/24 623/5.11 |
| 2013/0329184 A1 * | 12/2013 | Barzak | ............ | G02C 7/102 351/159.56 |
| 2014/0199521 A1 * | 7/2014 | Carpenter | ............ | G02C 7/021 428/163 |
| 2014/0354945 A1 * | 12/2014 | Martinu | ............ | G02B 1/105 351/159.62 |

* cited by examiner

METHOD FOR PRODUCING AN OPHTHALMIC LENS COMPRISING A STEP OF LASER MARKING IN ORDER TO PRODUCE PERMANENT ETCHINGS ON ONE SURFACE OF SAID OPHTHALMIC LENS

BACKGROUND OF THE INVENTION

Field of the Invention

The invention relates to processes for manufacturing ophthalmic lenses, including a laser-marking step for producing permanent engravings on a surface of the ophthalmic lens.

The invention also relates to a computer program including instructions configured to implement each of the steps of such a manufacturing process, to a command/control unit including system elements configured to execute a computer program implementing each step of such a manufacturing process and to a laser-marking machine including such a command/control unit.

The invention also relates to a client-server communication interface for transferring a computer program implementing each step of such a manufacturing process to a remote computer and its execution on this computer, or for transferring input and output data.

Description of the Related Field

It is known that ophthalmic lenses undergo various manufacturing steps. The manufacturing processes generally employed to obtain a finished lens edged to the shape of a particular frame typically comprise steps in which the surface of the ophthalmic lens is provided with markings which are referred to as permanent markings.

These markings may be formed by engravings, or microengravings, representing points or crosses and identifying a particular point (for example the optical center of the ophthalmic lens or the prism reference point for a progressive lens), or axis lines (for example for indicating the horizontal axis along which astigmatism is corrected), or shapes delimiting a particular zone (for example a near vision zone or a far vision zone in the case of a progressive ophthalmic lens).

Likewise, it may be necessary to produce markings allowing the lens to be identified, or other commercial markings.

These permanent markings are quite often produced on a concave face of the ophthalmic lens, this face being referred to as the back face.

In a process for manufacturing an ophthalmic lens, the latter is blocked, for example via its convex face, referred to as the front face, so that the concave surface of its back face can be machined by turning. Next, this machined concave surface is polished before undergoing one or more marking operations. Following these operations, which are more generally referred to as surfacing (machining and polishing) and marking operations, the ophthalmic lens is unblocked and cleaned before undergoing steps in which it is colored and/or varnished (in other words various layers of various functional compositions, such as an antireflection coating, an antifog coating, an anti-scratch coating, an anti-smudge coating, etc., are applied) and/or the lens is printed (in other words printed markings are produced using ink, these markings being what are referred to as temporary markings). The available and applied coatings are increasingly numerous and diverse and hence manufacturing processes are increasingly complex and place more and more stresses on the ophthalmic lens.

Permanent markings are generally produced using laser-marking machines emitting light radiation of wavelength comprised between about 3 µm and about 50 µm, in other words in the mid- to far-infrared. The effect of these laser-marking machines on the ophthalmic lens is that of a thermal marker that produces deformations in the material on the back face of this ophthalmic lens.

These deformations are characterized by geometric characteristics, such as a diameter and/or a depth, that are representative of an operating point of the laser-marking machine.

These deformations are in fact small recesses, also referred to as craters, formed in the surface of the ophthalmic lens. These recesses are surmounted by rims on this surface, which take the form of small peaks of material.

The deformations are sensitive to thermal stresses that the ophthalmic lens may be subjected to subsequent to the production of these markings. Now, the aforementioned coloring and/or varnishing steps may be carried out at temperatures of about 60° C. to 90° C., or even higher. For example, the varnishing step may comprise heating to a temperature of about 75° C. to about 85° C., in order to fix the varnish to the surface of the ophthalmic lens.

These temperatures inflict high thermal stresses on the ophthalmic lens because they are similar to stress relaxation threshold values of the lens (one may also express that as creep stresses). Thus, when the lens undergoes these steps, the recesses produced during the marking may be at least partially filled in (by contraction of the rims, or even contraction of the internal walls of the recesses). Thus, when the ophthalmic lens has undergone these steps and it is finished or almost finished, the markings referred to as permanent may be less visible, or even have at least partially disappeared.

The operating point of the laser-marking machine is not without effect on the conformity of the markings produced on the surface.

Thus, recesses of very large diameter may allow the effect of the high thermal stresses that an ophthalmic lens may be subjected to to be mitigated; however, this will affect the visibility thereof, such markings being too readily visible on the finished lens and possibly annoying the wearer of this lens, in addition to being unaesthetic. In contrast, recesses of too small a diameter, although they should not cause the wearer any annoyance, may affect conformity as these recesses could no longer be visible at all.

Generally, for any given manufacturing process, and in particular for given steps subsequent to the marking steps, trials are to be carried out in order to determine an optimal operating point of the laser-marking machine, but this decreases productivity.

BRIEF SUMMARY OF THE INVENTION

The invention aims to provide a process for manufacturing an ophthalmic lens allowing suitable marking parameters to be easily determined, these parameters allowing both a good productivity and a good conformity, in particular in terms of visibility, to be obtained for engravings produced on the surface of the ophthalmic lens.

Thus, one subject of the invention, according to a first aspect, is a process for manufacturing an ophthalmic lens comprising a laser-marking step for producing permanent engravings on a surface of said ophthalmic lens, at least one predetermined step subsequent to said laser-marking step and implementing severe thermal stresses that are applied to said surface and a step of determining an operating point of a laser-marking machine configured to implement said laser-marking step based on geometric characteristics of said engravings to be produced on said surface, characterized in that said step of determining said operating point includes the following steps:

determining a value representative of the deformation of said ophthalmic lens in at least one treatment zone of said surface in which said engravings are produced, from said severe thermal stresses and from data relating to a predetermined material from which said ophthalmic lens is formed; and deducing said operating point from said value representative of the deformation of said ophthalmic lens in said at least one treatment zone and from said geometric characteristics of said engravings.

The step of marking the ophthalmic lens of the process according to the invention takes into account the steps carried out after the marking of this ophthalmic lens that exert severe thermal stresses on the engravings produced on the ophthalmic lens.

The expression "severe thermal stresses" is understood to mean temperatures that are close to stress relaxation threshold values of the ophthalmic lens, wherein the values especially depend on the material from which the ophthalmic lens is produced.

The determined operating point is a fixed operating point insofar as a single operating point is determined by the process according to the invention. The marking step is therefore implemented using a laser-marking machine that is set to this determined operating point throughout the duration of the marking cycle.

It will be noted that the operating point is determined based on characterization of a predictable loss in the visibility (in other words partial or complete disappearance) of the permanent markings to be produced on the surface of the ophthalmic lens, which loss in visibility is due to steps subsequent to the marking step that thermally stress the ophthalmic lens.

In other words, it is a question, in the process according to the invention, of characterizing the effect of these steps carried out subsequently to the marking, in order to adjust the operating point of the laser-marking machine so as to guarantee good visibility (within the limits of the required conformity) of the permanent markings on the finished ophthalmic lens.

It will be noted that the value representative of the deformation of the ophthalmic lens is a measure representative, at least in a treatment zone of the lens, also called the zone thermally affected by the marking, of post-marking stresses on the engravings to be produced on the surface. It is therefore a question of a value that is perfectly representative of the predictable consequences of the thermal stresses that the ophthalmic lens, and in particular its engravings, are subjected to in the predetermined steps referred to as post-marking steps. It is furthermore a value that is perfectly representative of how difficult it is to preserve the visibility of the engravings from their production to when the ophthalmic lens is finished.

The process according to the invention allows the operating point of the laser-marking machine to be determined in a way that is particularly simple and easy, from values that it is possible to obtain with mathematical tools that are standard in the field of optics, these mathematical tools allowing, from a file containing a set of geometric and thermal data for a finite number of points (the number of points will vary from file to file and depends on the number of predetermined post-marking steps), the effect of steps subsequent to the marking on the engravings of the ophthalmic lens to be characterized.

Thus, the process according to the invention allows, via relatively simple calculations, the optimal operating point of the laser-marking machine to be determined.

Of course, the rules used to deduce the operating point of the laser-marking machine from the value representative of the deformation of the material of the ophthalmic lens and of the geometric characteristics of the engravings, are set based on a calibration that is easily carried out by way of a reasonable number of trials.

This calibration may furthermore be expressed in the form of a relatively simple lookup table, as explained below.

Thus, the process according to the invention allows suitable marking parameters to be easily determined, these parameters allowing both a good productivity and a good conformity, in particular in terms of visibility, to be obtained for engravings produced on the surface of the ophthalmic lens.

According to preferred, simple, practical and economical features of the process according to the invention:

said step of determining said operating point includes the following steps:

deducing a post-marking stress level from the value representative of the deformation of said ophthalmic lens and said geometric characteristics of said engravings; and selecting said operating point on the basis of said difficulty level, of geometric characteristics of said surface of said ophthalmic lens to be marked and of parameters specific to said laser-marking machine used;

said post-marking stress level is chosen from a plurality of post-marking stress levels predetermined as a function of predetermined ranges of geometric engraving characteristics and predetermined ranges of values representative of the deformation of the ophthalmic lens;

said step of determining said step of determining the value representative of the deformation of said ophthalmic lens in said at least one treatment zone includes the step of processing characteristics of said severe thermal stresses while taking into account individual characteristics specific to each said predetermined step subsequent to said step of laser marking the surface, all of said individual characteristics being taken into account;

said individual characteristics are representative of a treatment temperature and/or a treatment time;

said at least one predetermined step subsequent to said laser-marking step is a step of coloring or a step of varnishing said ophthalmic lens;

the process comprises a step of checking the conformity, in terms of visibility, of the engravings produced in said laser-marking step, after said ophthalmic lens has furthermore undergone said at least one predetermined step subsequent to said laser-marking step;

said determined operating point includes a value representative of a final diameter of said engravings and/or a final depth of said engravings;

said engravings each have a substantially circular general shape and are each formed by a recess around which there is a rim; and/or said at least one treatment zone of the surface is located in a substantially annular zone around one said engraving.

Another subject of the invention, according to a second aspect, is a computer program including instructions configured to implement each of the steps of the process such as described above when said computer program is run by a computer.

Another subject of the invention, according to a third aspect, is a command/control unit including system elements configured to run a computer program in order to implement each of the steps of the process such as described above.

Another subject of the invention, according to a fourth aspect, is a laser-marking machine configured to produce permanent engravings on a surface of an ophthalmic lens and including a command/control unit such as described above.

According to preferred, simple and economical features of the machine according to the invention, it is a question of a laser-marking machine employing a $CO_2$ laser configured to emit light radiation of wavelength comprised between about 8 μm and about 20 μm.

Another subject of the invention, according to a fifth aspect, is a client-server communication interface including devices configured to transfer the operating point of a laser-marking machine, this operating point being determined by a computer program that implements each of the steps of the process such as described above, when this computer program is run in a command/control unit.

BRIEF DESCRIPTION OF THE DRAWINGS

The subject matter of the invention will now be explained by way of a description of one embodiment thereof, given, by way of nonlimiting illustration, below with reference to the appended drawings, in which.

DETAILED DESCRIPTION OF THE PREFERRED EMBODIMENTS

Figure 1:
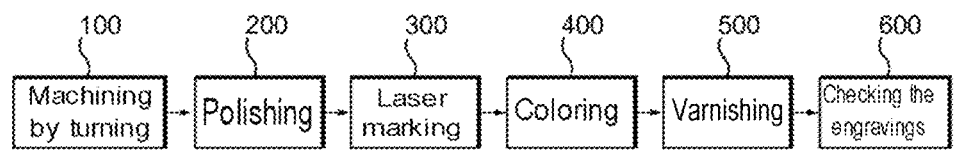
FIG. 1 is a flowchart illustrating various operating steps of a process for manufacturing an ophthalmic lens, especially including a laser-marking step.
Figure 2:
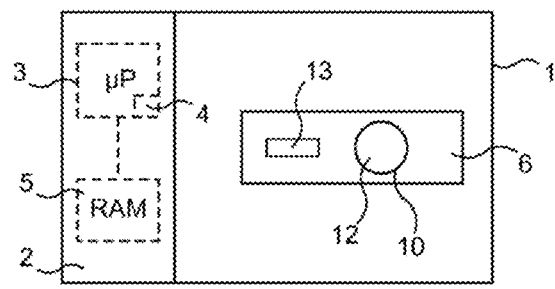
FIG. 2 schematically shows a laser-marking machine especially implementing the laser-marking step shown in FIG. 1.

FIG. 1 illustrates various operating steps of a process for manufacturing an ophthalmic lens 10, also referred to as a spectacle eyeglass (shown in FIG. 2), including:

a step 100 of machining the surface 12 (shown in FIG. 2) by turning, a back face of the ophthalmic lens in FIG. 2, in order to give it a predetermined optical function (roughing and/or finishing step) produced for example using a precision machine tool such as a tool (not shown) of the type referred to as "digital surfacing" tools;

a step 200 of polishing the machined surface of the ophthalmic lens, in order to provide it with a transparency suitable for the ophthalmic field, carried out for example using a polisher (not shown);

a step 300 of laser marking the polished surface of the ophthalmic lens, in order to produce therein permanent engravings for example using a laser-marking machine 1 (shown in FIG. 2);

a step 400 of coloring at least the marked surface of the ophthalmic lens, in order to give it at least one predetermined tint applied for example using a treatment machine (not shown) in which the lens is dip-coated and then heated;

a step 500 of varnishing at least the colored and marked surface of the ophthalmic lens, in order to provide it with at least one predetermined treatment, for example an antireflection coating, and/or an antifog coating, and/or an anti-scratch coating, and/or an anti-smudge coating, for example using a treatment machine in which the lens is dip-coated and then heated and/or a treatment machine in which the treatment is a plasma treatment or the coating is evaporated (machine(s) not shown); and a step 600 of checking the conformity, in terms of visibility, of the engravings produced beforehand in step 300 on the surface of the ophthalmic lens, for example using a device equipped with a visual sensor.

It will be noted that the manufacturing process may for example not include the coloring step or the step(s) of varnishing the ophthalmic lens 10.

FIG. 2 illustrates a digitally controlled laser-marking machine 1, the expression "digitally controlled" being understood to mean that the machine includes suites of hardware and software the function of which is to give motional instructions to all the units of the marking machine 1.

This machine 1 is configured to produce permanent engravings 24 (shown in FIGS. 6 and 7) on the surface 12 of the ophthalmic lens 10.

To do this, the machine 1 includes a spindle 13 bearing a marking tool, here a carbon dioxide laser ($CO_2$ gas laser) configured to emit light radiation of wavelength comprised between about 8 μm and about 20 μm.

The machine 1 furthermore comprises a command/control unit 2, and the latter is provided with a data processing system comprising a microprocessor 3 equipped with a memory 4, especially a nonvolatile memory, allowing the microprocessor 3 to load and store a software package, in other words a computer program, that, when it is run by the microprocessor 3, allows a polishing process to be implemented.

This nonvolatile memory 4 is for example a read-only memory (ROM).

The unit 2 furthermore comprises a memory 5, especially a volatile memory, allowing data to be stored while the software package is being run and the process implemented.

This volatile memory 5 is for example a random access memory (RAM) or an electrically erasable programmable read-only memory (EEPROM).

The machine 1 in addition comprises a glazed aperture 6 designed to allow the surface 12 of the ophthalmic lens 10 on which the machine 1 acts to be seen, said ophthalmic lens 10 being borne by a predetermined holder (not shown).

This glazed aperture 6 makes it possible, while the process is being implemented, for a user of this machine 1 to view the ophthalmic lens 10 in the machine 1, and thus check that the process is proceeding correctly.

To mark the ophthalmic lens 10, it is necessary to know with precision certain marking parameters such as the diameter $D_F$ and the depth $Pr_F$ of the engravings 24 to be produced.

These parameters $D_F$ and $Pr_F$ are setpoints input into the machine 1.

To do this, the process according to the invention includes a step of determining each of these parameters.

Steps for determining the diameter $D_F$ and the depth $Pr_F$ of the engravings 24 to be produced, taking into consideration the coloring and varnishing steps 400 and 500 to be carried out after the laser-marking step 300, will now be described with reference to FIGS. 3 to 7.

Figure 4:
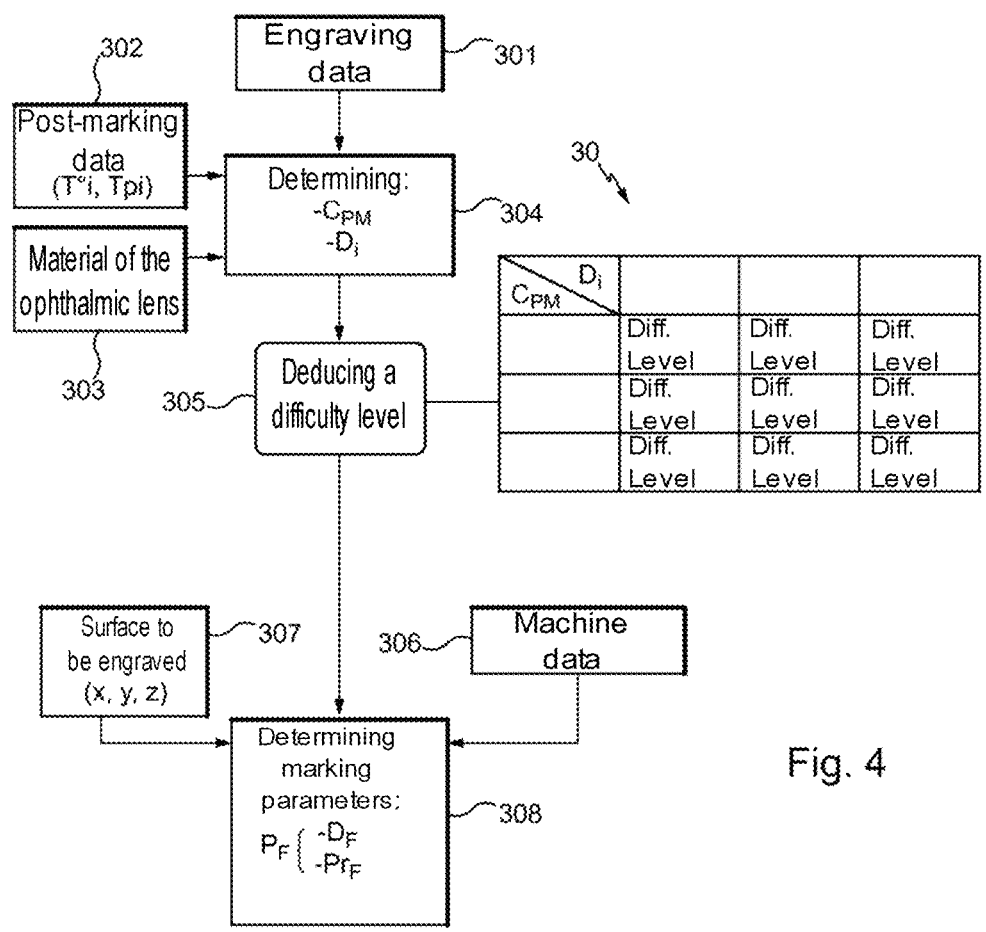
FIG. 4 is a flowchart illustrating various operating steps of the manufacturing process.

FIG. 4 is a flowchart of the steps allowing the aforementioned parameters $D_F$ and $Pr_F$ to be determined.

The command/control unit 2 is configured to receive, in the step 301, characteristic data characterizing the predetermined marking step, which here correspond to geometric and optionally personalization characteristics of the engravings 24 to be produced.

The unit 2 is furthermore configured to receive, in the step 302, characteristic data characterizing the predetermined post-marking steps, here the coloring step 400 and the varnishing step 500. These data here correspond to temperature values T° i to which the ophthalmic lens 10 is subjected, for example the temperatures of baths into which this lens is dipped, and to time values Tpi relating to the periods during which the ophthalmic lens 10 is subjected to these temperatures T° i, or, in other words, the duration of time for which this lens remains for example in the baths.

The unit 2 is furthermore configured to receive, in the step 303, characteristic data characterizing the material of the ophthalmic lens 10, which may be formed from one or more predetermined materials. These characteristic data are for example related to the behavior of the one or more materials under severe thermal stresses. More precisely, these data for example correspond to strain relaxation threshold values and to the refractive index of the one or more materials.

The unit 2 is configured to determine, in the step 304, a value representative of the post-marking stresses $C_{PM}$ in at least one treatment zone 25 (shown in FIGS. 6 and 7) of the surface 12, in which the engravings 24 are produced, and an initial diameter $D_i$ of the engravings 24 to be produced, from post-marking data that are representative of the severe thermal stresses, from data relating to the material of the ophthalmic lens 10 and from the engraving data received in steps 302, 303 and 301, respectively.

It will be noted that the value representative of the post-marking stresses $C_{PM}$ in fact corresponds to a value representative of the deformation of the ophthalmic lens 10 due to the post-marking steps.

This step 303 allows the effect of steps subsequent to the marking of the engravings 24 to be characterized.

The unit 2 is configured to deduce, in the step 305, an intrinsic difficulty level of the step of marking the surface 12 from the value $C_{PM}$ of deformation of the ophthalmic lens 10 and from the initial diameter $D_i$ of the engravings 24 to be produced. This intrinsic difficulty level of the marking of the surface 12 in other words corresponds to a post-marking stress level.

Figure 3:
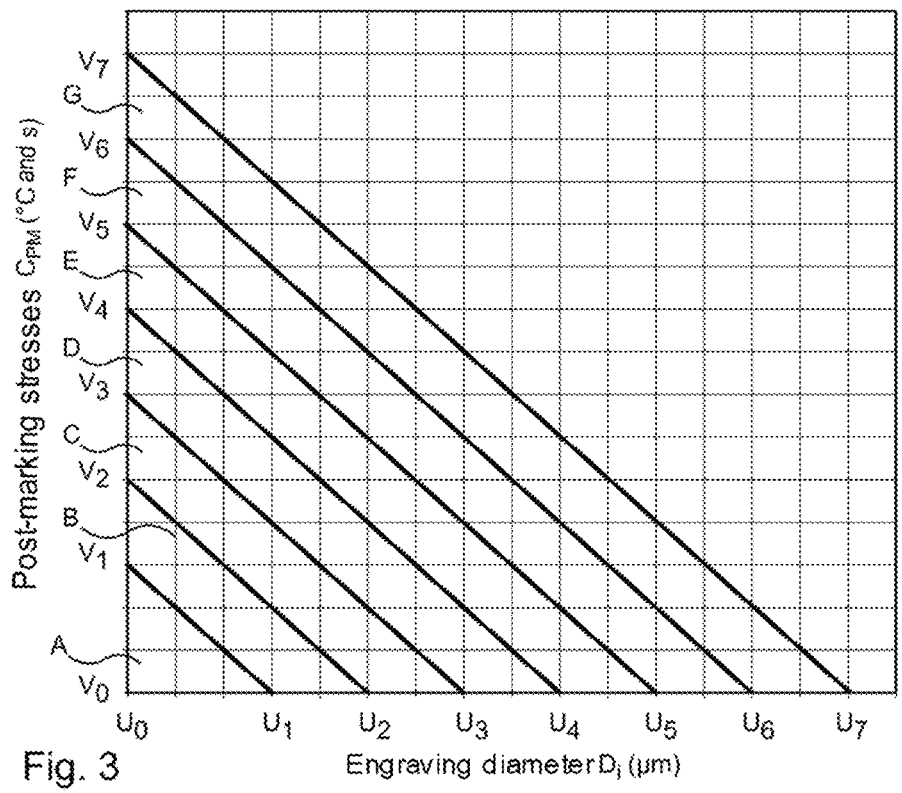
FIG. 3 illustrates a lookup table, taking the form of a graph, of predetermined marking difficulty levels.

This intrinsic difficulty level of the marking of the surface 12 is selected from a lookup table 30 shown in the form of a graph in FIG. 3 and, in FIG. 4, in the form of a matrix constructed beforehand and memorized in the unit 2.

This lookup table 30 contains a plurality of intrinsic difficulty level values, which plurality of values is associated with various predetermined ranges of values $V_0$ to $V_7$ of stresses $C_{PM}$ and $U_0$ to $U_7$ of diameters $D_i$.

The values $V_0$ to $V_7$ of the stresses $C_{PM}$ are expressed in degrees Celsius and seconds whereas the values $U_0$ to $U_7$ of the diameters $D_i$ are expressed in microns.

The values $V_0$ to $V_7$ of the stresses $C_{PM}$ and the values $U_0$ to $U_7$ of the diameters $D_i$ correspond to the y-axis and x-axis of said lookup table 30, respectively.

Seven difficulty levels, referenced A to G respectively and representative of an increasing level of difficulty, are shown.

The lookup table 30 contains thresholds separating the difficulty levels A to G, which thresholds are represented by lines having a negative slope, each of these lines corresponding to the limit between two successive difficulty levels.

It will be seen below, with reference to FIG. 8, how this lookup table 30 is constructed.

The unit 2 is furthermore configured to receive, in the step 306, parameters specific to the marking machine 1 used.

The command/control unit 2 is configured to receive, in the step 307, a surface file that contains geometric characteristics representative of the surface 12, in the form of x, y, z, θ coordinates of a finite number of points.

The unit 2 is configured to determine, in the step 308, the optimal operating point $P_F$ of the marking machine 1 from the difficulty level A-G, from the laser of this marking machine 1 and from the geometry of the ophthalmic lens 10.

This optimal operating point $P_F$ is characterized by marking parameters, and more precisely by the final diameter $D_F$ and the final depth $Pr_F$ of the engravings 24 to be produced on the surface 12 of the ophthalmic lens 10.

This step 308 thus allows the operating point of the laser-marking machine 1 to be adjusted so that good visibility (within the limits of the required conformity) of the engravings 24 on the finished ophthalmic lens 10 is guaranteed. These cumulative parameters are representative of the geometry of the engravings 24 and are crucial to the conformity of the latter.

Thus, the marking step 300 of the manufacturing process may be implemented in the laser-marking machine 1.

Figure 5:
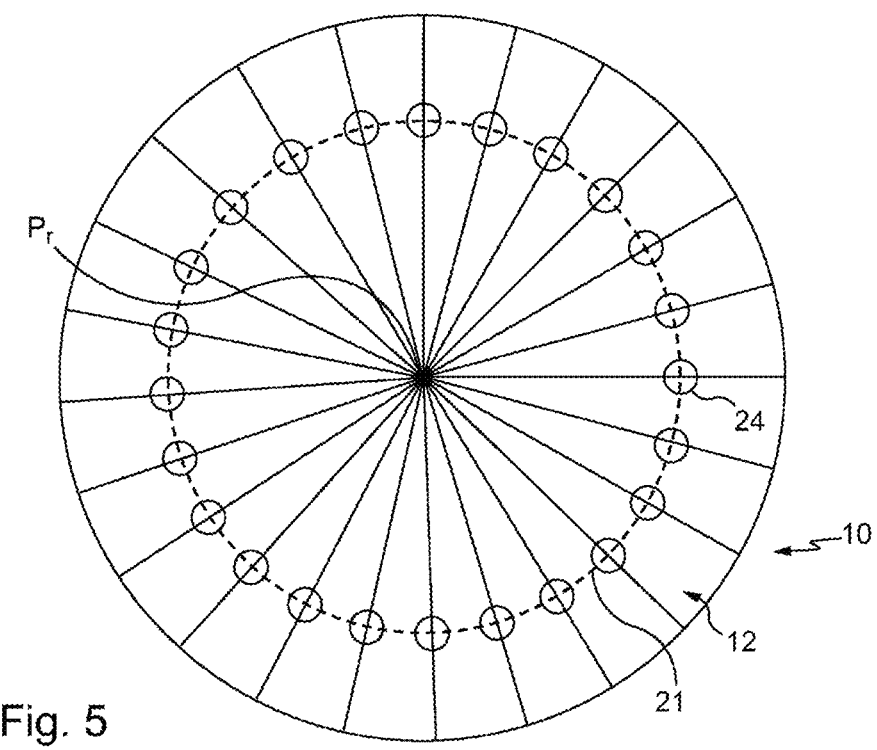
FIG. 5 schematically illustrates the surface of an ophthalmic lens provided with engravings produced in the laser-marking step shown in FIG. 1 with the machine illustrated in FIG. 2.

FIG. 5 shows the engraved and finished ophthalmic lens 10 i.e. the lens after the post-marking steps of coloring 400, varnishing 500 and optionally checking 600 of the engravings.

The engravings 24 are here produced on the surface 12 of the back face of the ophthalmic lens 10. These engravings are regularly distributed over a circle 21 of predetermined diameter and are each at equal distance from a reference point $P_r$ here corresponding to the center of the surface 12 of the ophthalmic lens 10.

Figure 6:
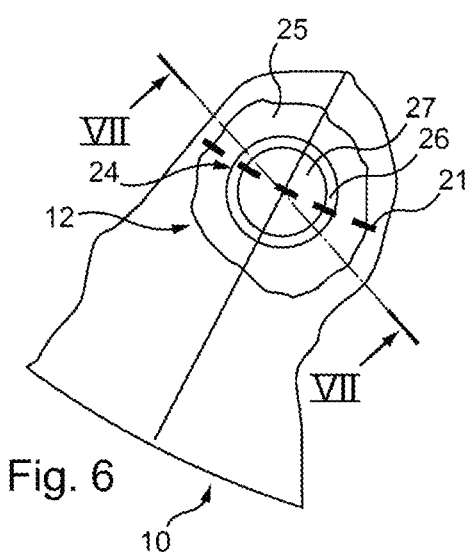
FIG. 6 is a detailed view of an engraving on the surface of the ophthalmic lens illustrated in FIG. 5.
Figure 7:
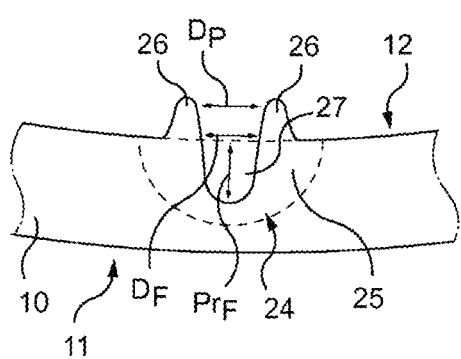
FIG. 7 is a cross-sectional view along the line VII-VII shown in FIG. 6.

FIGS. 6 and 7 show in more detail one of the engravings 24 produced on the ophthalmic lens 10.

It will be seen that each engraving 24 is located in a treatment zone 25 i.e. a zone thermally affected by the laser-marking step 300.

It is in these thermally affected zones 25 of the ophthalmic lens 10 that the thermal stresses due to the post-marking steps are the most severe.

The engraving 24 takes the form of a crater consisting of a circular recess 27 having the final diameter $D_F$ and the final depth $Pr_F$ determined in the step 308, and of an annular rim 26 extending around a free edge of the recess 27.

The annular rim 26 results from material deformed in the laser-marking step 300 and has a diameter $D_P$ larger than the final diameter $D_F$.

Here, the engravings 24 produced on the surface 12 of the ophthalmic lens 10 are perfectly visible and more generally conform to the desired engravings. This is due to the fact that the operating point of the laser-marking machine 1 used in the laser-marking step 300 is set to a determined setpoint.

Specifically, this determined setpoint allows the engravings to be and remain visible and compliant despite the severe thermal stresses that they are subjected to in the post-marking steps, which stresses in practice make the annular rim 26 and/or the internal space inside the recess 27 deform, possibly decreasing the diameter of the engraving 24.

Figure 8:
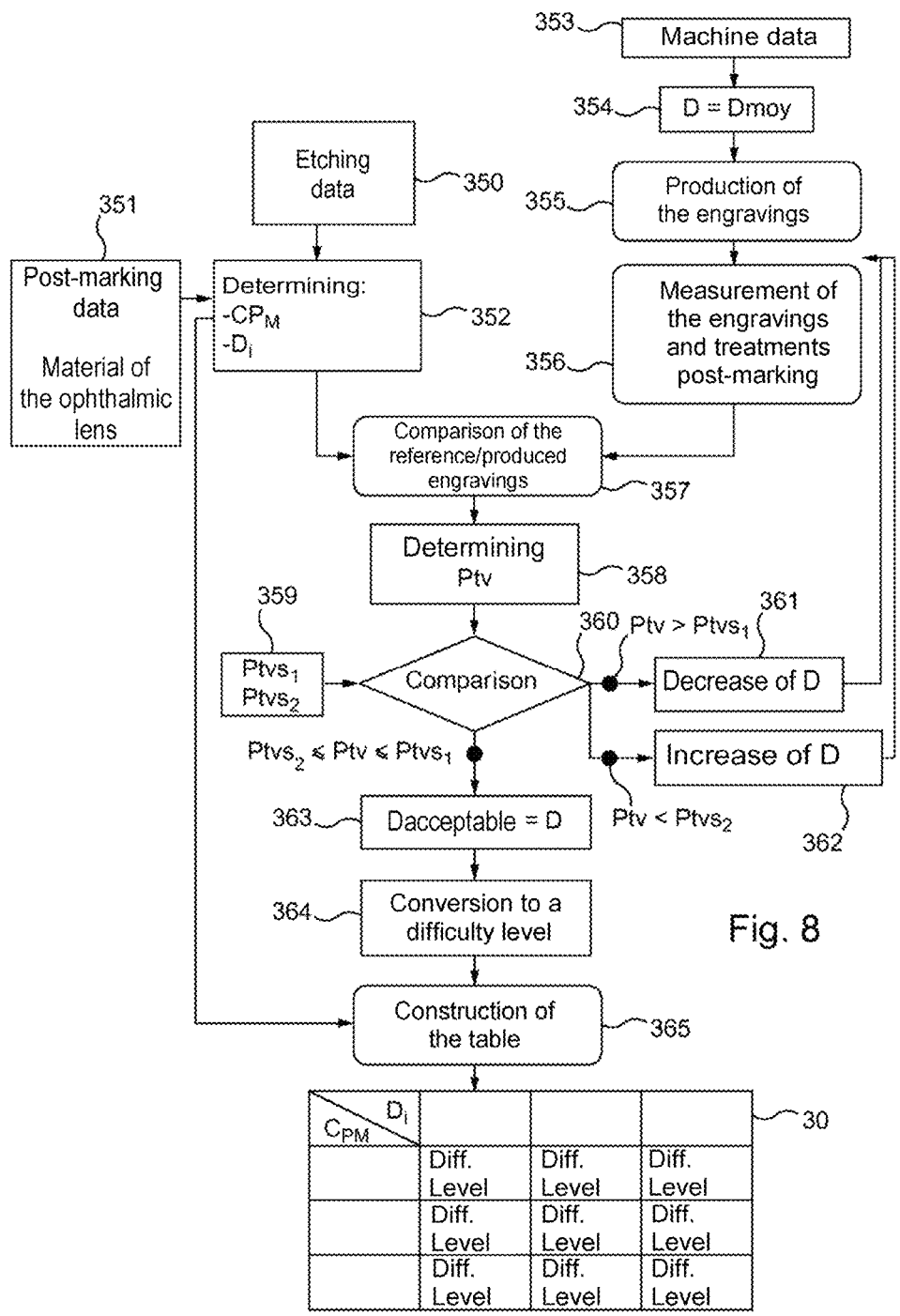
FIG. 8 is a flowchart illustrating the steps used to construct the lookup table.

FIG. 8 is a flowchart of steps allowing the lookup table 30 of difficulty levels to be constructed, this table being memorized in the memory 4 of the data-processing system of the unit 2.

This lookup table may be constructed directly by the unit 2 or beforehand by another data-processing system and loaded into the memory 4 of the system of the unit 2.

To construct the lookup table 30 of difficulty levels, reference engravings to be produced on a surface to be marked are chosen, in a step 350, and characteristic data characterizing the geometry and optionally personalization parameters of the engravings 24 are obtained, as in the step 301 described above.

Furthermore, in the step 351, characteristic data $T°$ i and Tpi characterizing predetermined post-marking steps and characteristic data characterizing the material of the ophthalmic lens 10 are obtained, as in the steps 302 and 303 described above.

A value representative of the post-marking stresses $C_{PM}$ and an initial diameter $D_i$ of the engravings 24 to be produced are determined in the step 352, as in the step 304 described above.

Furthermore, in the step 353, parameters specific to a marking machine are obtained.

In the step 354, the initial diameter value of the engraving to be produced is chosen as the largest diameter in the range of diameters producible by the machine, this range is furthermore chosen depending on the material of the ophthalmic lens to be engraved.

In the step 355, the marking machine produces the chosen reference engravings on the surface of an ophthalmic lens and the latter furthermore undergoes the predetermined post-marking steps.

Next, in the step 356, the diameter and depth of the engravings produced on the surface of the engraved and treated ophthalmic lens are measured.

Next, in the step 357, the engravings produced on the surface of the ophthalmic lens are compared, after the post-marking treatments, to the chosen reference engravings, from which comparison a so-called residual engraving is deduced.

This residual engraving is generated by deformation of the material of the ophthalmic lens in the post-marking treatment steps.

Thus, in the step 358, a value of a "peak to valley" difference Ptv representative of variations in the diameters and depths of the residual engravings is determined.

Next, in a step 360, the determined difference Ptv is compared to the threshold difference values $Ptvs_1$ and $Ptvs_2$ obtained in a step 359.

If the comparison results in a value Ptv higher than the value $Ptvs_1$, this means that the chosen diameter does not form part of the acceptable range of diameters and that it is therefore necessary to decrease the diameter in a step 361. It may, depending on the circumstances, be necessary to engrave then treat a new ophthalmic lens surface, then to perform the measurement and comparison steps (steps 355 to 357) again.

If the comparison results in a value Ptv lower than the value $Ptvs_2$, this means that the chosen diameter does not form part of the acceptable range of diameters and that it is therefore necessary to increase the diameter in a step 362. It may, depending on the circumstances, be necessary to engrave then treat a new ophthalmic lens surface, then to perform the measurement and comparison steps (steps 355 to 357) again.

If the comparison results in a value Ptv that is both lower than the value $Ptvs_1$, and higher than the value $Ptvs_2$, this means that the diameter chosen does form part of the acceptable range of diameters and the maximum acceptable diameter (denoted $D_i$) of the engravings is deduced therefrom in a step 363.

Next, in the step 364, the deduced maximum diameter is converted to a difficulty level, ranging from A to G.

The value of Ptvs corresponds to the threshold between two difficulty levels.

In other words, this value of Ptvs corresponds to the lines of equal or negative slopes, lines said to be of iso Ptv, seen above in FIG. 3.

It is thus possible to construct and fill the lookup table 30 in a step 365 by attributing a difficulty level to the pair formed by the acceptable maximum diameter value $D_i$ and the stress value $C_{PM}$, until a complete lookup table 30 is obtained.

Figure 9:
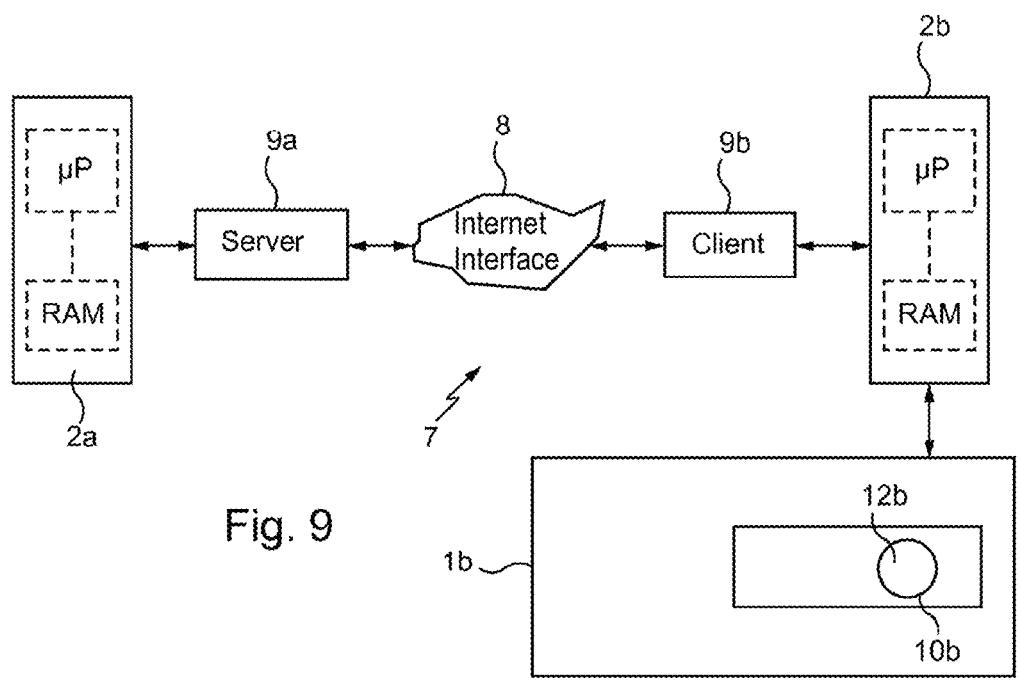
FIG. 9 schematically shows a client-server communication interface including devices configured to transfer the operating point determined by the manufacturing process to a remote command/control unit.

FIG. 9 illustrates a client-server communication interface 7 including what is referred to as a provider side 9a and another side referred to as a client side 9b, these two sides communicating via an Internet interface 8.

The provider side comprises a server 9a connected to a command/control unit 2a of the same type as that in FIG. 1, but this time not integrated into a laser-marking machine, this server 9a being configured to communicate with the Internet interface 8.

The client side 9b is configured to communicate with the Internet interface 8, and is connected to a command/control unit 2b of the same type as that of the provider side.

Furthermore, the client-side unit 2b is connected to a laser-marking machine 1b of the same type as that in FIG. 1 for producing engravings on a surface 12b of an ophthalmic lens 10b.

The unit 2b is configured to receive, client-side, a file containing characteristic data characterizing the engravings to be produced on the surface 12b, characteristic data characterizing the post-marking steps, characteristic data characterizing parameters specific to the laser-marking machine 1b used, and characteristic data characterizing the material of the ophthalmic lens 10b used.

This unit 2b transmits via the Internet interface 8 and the server 9a these data to the provider-side unit 2a in order to determine the operating point of the laser machine 1.

This unit 2a runs, via its data-processing system, the computer program that it contains, in order to implement the step of determining the operating point of the laser machine 1b of the process for manufacturing the ophthalmic lens 10b, in order to mark the surface 12b of this ophthalmic lens 10b.

The unit 2a transmits, via the server 9a and the Internet interface 8, this determined operating point to the client-side command/control unit 2b.

This unit 2b is configured to run a program for implementing a manufacturing process of the ophthalmic lens 10b, using the received parameters, in order to produce the engravings on the ophthalmic lens 10b.

As variants (not illustrated):
- the difficulty level table does not have 7 difficulty levels, this table instead having fewer or more difficulty levels, for example between 2 and 10;
- the command/control unit does not include a microprocessor, but rather a microcontroller;
- the communication interface may enable communication via a network other than the Internet, for example via an intranet or a secure private network; and/or
- the communication interface 8 may also allow the entire computer program to be transferred to the remote data-processing system 2b in order to implement certain steps of the process in the machine 1b (step of determining the operating point and marking step) and other steps of the process in a plurality of other machines (steps of machining, coloring and varnishing).

It is recalled more generally that the invention is not limited to the examples described and shown.

The invention claimed is:

1. A process for manufacturing an ophthalmic lens (10) made from at least one material, said process comprising:
   a step of determining an operating point of a laser-marking machine configured to produce permanent engravings, having geometric characteristics (Di), upon a surface of said ophthalmic lens;
   a laser-marking step (300) that produces said permanent engravings (24) on said surface (12) of said ophthalmic lens (10), said permanent engravings (24) comprising at least first deformations on said surface (12) of said ophthalmic lens (10), said first deformations shaped as craters including at least a recess formed in said surface of said ophthalmic lens and a rim surmounting said recess on said surface of said ophthalmic lens, a diameter and a depth of said recess defining said geometric characteristics of said engravings; and
   subsequent to said laser-marking step (300), a predetermined step (400, 500), including at least one of a coloring step and a varnishing step, applied to said surface (12) of said ophthalmic lens (10) and to the engravings (24) on said surface of said ophthalmic lens, said at least one predetermined step (400, 500) being carried out during a treatment time and at a temperature which is close to stress relaxation threshold values of said at least one material of said ophthalmic lens such as to apply severe thermal stresses to said surface (12) and to the engravings (24) on said surface of said ophthalmic lens (12), said severe thermal stresses applied to said engravings by said predetermined step characterized at least by said treatment time and said temperature, and generating second deformations on said recesses and on said rims thereby generating post-marking stresses to said first deformations,
   wherein said step of determining said operating point of the laser-marking machine includes the following steps:
   determining (304) a value ($C_{PM}$) representative of the post-marking stresses in at least one treatment zone (25) of said surface of said ophthalmic lens in which said permanent engravings (24) are produced, from i) said severe thermal stresses to be applied to said engravings (24) on said surface (12) of said ophthalmic lens during the predetermined step (400, 500), and from ii) data relating to said material from which said ophthalmic lens (10) is formed; and
   deducing said operating point ($P_F$) i) from said value ($C_{PM}$) representative of said post-marking stresses in said at least one treatment zone (25) and ii) from said geometric characteristics (Di) of said permanent engravings (24).

2. The process as claimed in claim 1, wherein said step of determining said operating point further comprises the following steps:
   deducing (305) a post-marking stress level (A-G) from said value ($C_{PM}$) representative of said post-marking stresses ($C_{PM}$) and said geometric characteristics (Di) of said engravings (24), said post-marking stress level (A-G) providing a difficulty level (A-G); and
   selecting (308) said operating point ($P_F$) based on said difficulty level (A-G), of geometric characteristics (x, y, z) of said surface (12) of said ophthalmic lens (10) to be marked and based on parameters specific to said laser-marking machine (1).

3. The process as claimed in claim 2, wherein said post-marking stress level (A-G) is chosen from a plurality of post-marking stress levels (A-G) predetermined as a function of predetermined ranges of said geometric characteristics of said permanent engravings and predetermined ranges of values ($C_{PM}$) representative of said post-marking stresses.

4. The process as claimed in claim 3, wherein said step of determining the value ($C_{PM}$) representative of post-marking stresses ($C_{PM}$) in said at least one treatment zone (25) includes a step of processing characteristics ($T°_i$, $Tp_i$) of said severe thermal stresses while taking into account individual characteristics specific to each said predetermined step subsequent to said step (300) of laser marking the surface (12), all of said individual characteristics being taken into account.

5. The process as claimed in claim 2, wherein said step of determining the value ($C_{PM}$) representative of post-marking stresses ($C_{PM}$) in said at least one treatment zone (25) includes a step of processing characteristics ($T°_i$, $Tp_i$) of said severe thermal stresses while taking into account individual characteristics specific to each said predetermined step (400, 500) subsequent to said step (300) of laser marking the surface (12), all of said individual characteristics being taken into account.

6. The process as claimed in claim 1, wherein said step of determining the value ($C_{PM}$) representative of said post-marking stresses ($C_{PM}$) in said at least one treatment zone (25) includes a step of processing characteristics ($T°_i$, $Tp_i$) of said severe thermal stresses while taking into account individual characteristics specific to each said predetermined step (400, 500) subsequent to said step (300) of laser marking the surface (12), all of said individual characteristics being taken into account.

7. The process as claimed in claim 1, further comprising:
   a step (600) of checking a conformity, in terms of visibility, of the engravings (24) produced in said laser-marking step (300), after said ophthalmic lens (10) has undergone said at least one predetermined step (400, 500) subsequent to said laser-marking step.

8. The process as claimed in claim 1, wherein said determined operating point ($P_F$) includes at least one of a value representative of a final diameter ($D_F$) of said engravings (24) and a value representative of a final depth ($Pr_F$) of said permanent engravings (24).

9. The process as claimed in claim 1, wherein said permanent engravings (24) each have a substantially circular shape.

10. The process as claimed in claim 1, wherein said at least one treatment zone (25) of the surface (12) is located in a substantially annular zone around one of said engraving permanent engravings (24).

11. The process as claimed in claim 1,
wherein said at least one predetermined step subsequent to said laser-marking step (300) is a step (400) of coloring said ophthalmic lens (10), and
wherein the engravings produced in said laser-marking step (300) remain visible after said at least one predetermined step (400, 500) applies the severe thermal stresses to the engravings (24).

12. The process as claimed in claim 1,
wherein said predetermined step subsequent to said laser-marking step (300) is a step (400) of varnishing said ophthalmic lens (10), and
wherein the engravings produced in said laser-marking step (300) remain visible after said at least one predetermined step (400, 500) applies the severe thermal stresses to the permanent engravings (24).

13. A computer program including instructions configured to implement each of the steps of the process as claimed in claim 1, when said computer program is run by a computer.

14. A command/control unit including system elements (3, 4, 5) configured to run a computer program in order to implement each of the steps of the process as claimed in claim 1.

15. A laser-marking machine configured to produce permanent engravings (24) on a surface (12) of an ophthalmic lens (10) and including a command/control unit (2) as claimed in claim 14.

16. The machine as claimed in claim 15, wherein the laser-marking machine (1) employs a $CO_2$ laser configured to emit light radiation of wavelength comprised between about 8 μm and about 20 μm.

17. A client-server communication interface including devices (9a, 9b) configured to transfer the operating point ($P_F$) of a laser-marking machine, said operating point being determined by a computer program that implements each of the steps of the process according to claim 1, when said computer program is run in a command/control unit (2).

* * * * *